US012625536B2

(12) United States Patent
Liang et al.

(10) Patent No.: US 12,625,536 B2
(45) Date of Patent: May 12, 2026

(54) CIRCUIT TO PROTECT AGAINST MULTI-RAIL VOLTAGE GLITCHING ATTACKS

(71) Applicant: NVIDIA Corp., Santa Clara, CA (US)

(72) Inventors: Jiale Liang, San Jose, CA (US);
Prashant Singh, Apison, TN (US);
Nishit Harshad Shah, Sunnyvale, CA (US); Daniel Nguyen, San Jose, CA (US); Kaushik Krishna Raghuraman, Campbell, CA (US); Suhas Satheesh, Sunnyvale, CA (US); Ting Lu, Austin, TX (US); Roman Surgutchik, Gilbert, AZ (US); Tezaswi Raja, San Jose, CA (US)

(73) Assignee: NVIDIA Corp., Santa Clara, CA (US)

( * ) Notice: Subject to any disclaimer, the term of this patent is extended or adjusted under 35 U.S.C. 154(b) by 204 days.

(21) Appl. No.: 18/342,341

(22) Filed: Jun. 27, 2023

(65) Prior Publication Data

US 2025/0004522 A1 Jan. 2, 2025

(51) Int. Cl.
| | |
|---|---|
| *G06F 1/00* | (2006.01) |
| *G05F 1/46* | (2006.01) |
| *G06F 1/24* | (2006.01) |
| *G06F 1/28* | (2006.01) |

(52) U.S. Cl.
CPC ................ *G06F 1/28* (2013.01); *G05F 1/468* (2013.01); *G06F 1/24* (2013.01)

(58) Field of Classification Search
CPC ............... G06F 1/28; G06F 1/468; G06F 1/24
See application file for complete search history.

(56) References Cited

U.S. PATENT DOCUMENTS

| | | | | |
|---|---|---|---|---|
| 6,745,331 | B1 * | 6/2004 | Silverbrook | .......... H04L 9/3271 347/14 |
| 11,283,434 | B2 * | 3/2022 | Geyari | ..................... H03K 5/19 |
| 2004/0236961 | A1 * | 11/2004 | Walmsley | ................. G07F 7/12 713/300 |
| 2005/0134361 | A1 * | 6/2005 | Tschanz | .................... G06F 1/10 327/534 |
| 2020/0402602 | A1 * | 12/2020 | Mahatme | ............. G11C 29/021 |
| 2021/0294410 | A1 * | 9/2021 | Rajpathak | ................. G06F 1/30 |
| 2021/0333334 | A1 * | 10/2021 | Staudenmaier | .. G01R 19/16571 |
| 2022/0014181 | A1 * | 1/2022 | Geyari | ..................... G11C 7/24 |

* cited by examiner

*Primary Examiner* — Mohammed H Rehman
(74) *Attorney, Agent, or Firm* — Carnelian Law, LLC

(57) ABSTRACT

A circuit includes a bandgap circuit configured to generate multiple reference voltages. A first voltage glitching detection circuit utilizes a first one of the reference voltages and a first power rail to generate a first reset signal in response to a voltage glitching attack on the first power rail, and a second voltage glitching detection circuit operates independently of the reference voltages to generate a second reset signal in response to the voltage glitching attack on the first power rail.

17 Claims, 6 Drawing Sheets

A - Rail$_1$ (dependent power rail)
B - Rail$_2$
C - Rail$_3$

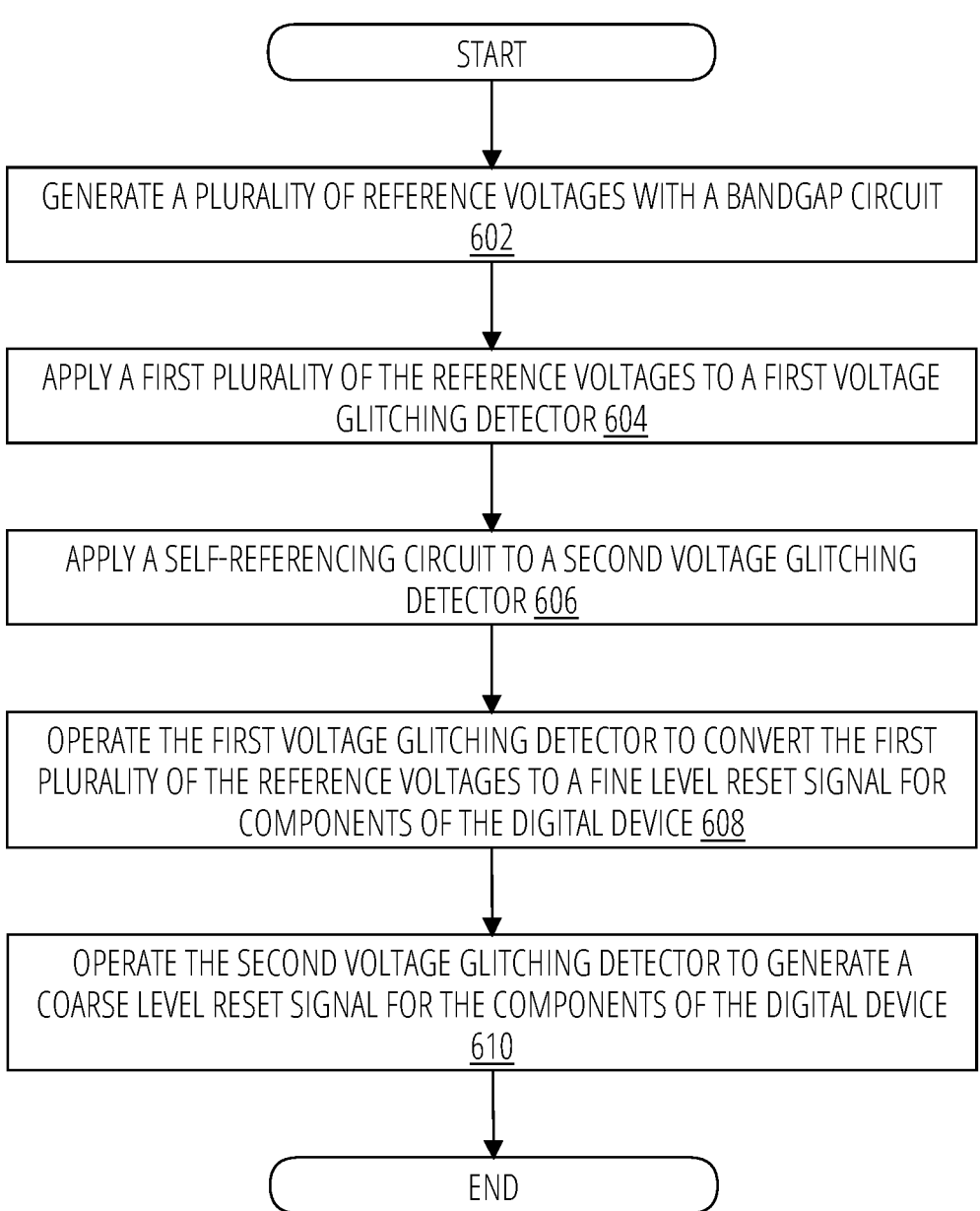

START

GENERATE A PLURALITY OF REFERENCE VOLTAGES WITH A BANDGAP CIRCUIT
602

APPLY A FIRST PLURALITY OF THE REFERENCE VOLTAGES TO A FIRST VOLTAGE
GLITCHING DETECTOR 604

APPLY A SELF-REFERENCING CIRCUIT TO A SECOND VOLTAGE GLITCHING
DETECTOR 606

OPERATE THE FIRST VOLTAGE GLITCHING DETECTOR TO CONVERT THE FIRST
PLURALITY OF THE REFERENCE VOLTAGES TO A FINE LEVEL RESET SIGNAL FOR
COMPONENTS OF THE DIGITAL DEVICE 608

OPERATE THE SECOND VOLTAGE GLITCHING DETECTOR TO GENERATE A
COARSE LEVEL RESET SIGNAL FOR THE COMPONENTS OF THE DIGITAL DEVICE
610

END

FIG. 6

CIRCUIT TO PROTECT AGAINST MULTI-RAIL VOLTAGE GLITCHING ATTACKS

BACKGROUND

A concern with modern chips is protecting the integrated circuits on those chips against voltage glitching attacks. Voltage glitching attacks are intrusions in chips used in devices that utilize integrated circuits for securing gaming, automotive, and server applications, for example. A voltage glitching attack is an intentional fault introduced to undermine device security. The fault can cause instruction skipping, instruction decoding errors, and improper data read and write backs. An electrical type of voltage glitching attack can target the clock or the power systems. A power voltage glitching attack may involve a pull to ground (i.e., blackout), pulling down the supply voltage (i.e., brownout), or an increase in voltage (i.e., spiking).

Supply voltage glitching is a type of hardware attack. By voltage glitching the power supply voltage, a hacker may either bypass a device authentication process or enter unauthorized logic through Joint Test Action Group (JTAG) access. If voltage glitching attacks can be detected, they may be prevented for example by resetting the circuits under attack.

Conventional voltage glitch protection circuits utilize power-on detectors that may exhibit large voltage-temperature variation in operation. The generation of reset signals from these conventional power-on detectors in response to voltage glitching attacks may therefor be unreliable. Additionally, it has proven challenging to implement solutions that protect multiple power rails from simultaneous or compounded voltage glitching attacks.

Power-on detectors have been utilized to force a reset of a circuit system (e.g., a system-on-a-chip) in the event of a forced power or glitches below a configured voltage threshold. However, conventional power-on detectors may exhibit relatively high process, voltage, and temperature variation. This may necessitate setting the voltage threshold conservatively, creating a wide vulnerability band to voltage glitching and a risk of reset signals not propagating properly. Moreover, conventional power-on detector mechanisms lack dependent power rail voltage glitching protections. The dependent power rail is the power rail supplying the circuitry that generates reference voltages utilized by the detectors to generate reset signals in response to voltage glitching attacks.

If the dependent power rail is attacked, downstream glitch monitors may not operate reliably. Conventional power-on detectors may also utilize fixed settings for voltage thresholds with no programmability, and hence may have constrained applicability.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 depicts a process for detecting voltage glitching attacks on multiple power rails in a digital device in accordance with one embodiment.

DETAILED DESCRIPTION

Figure 1:
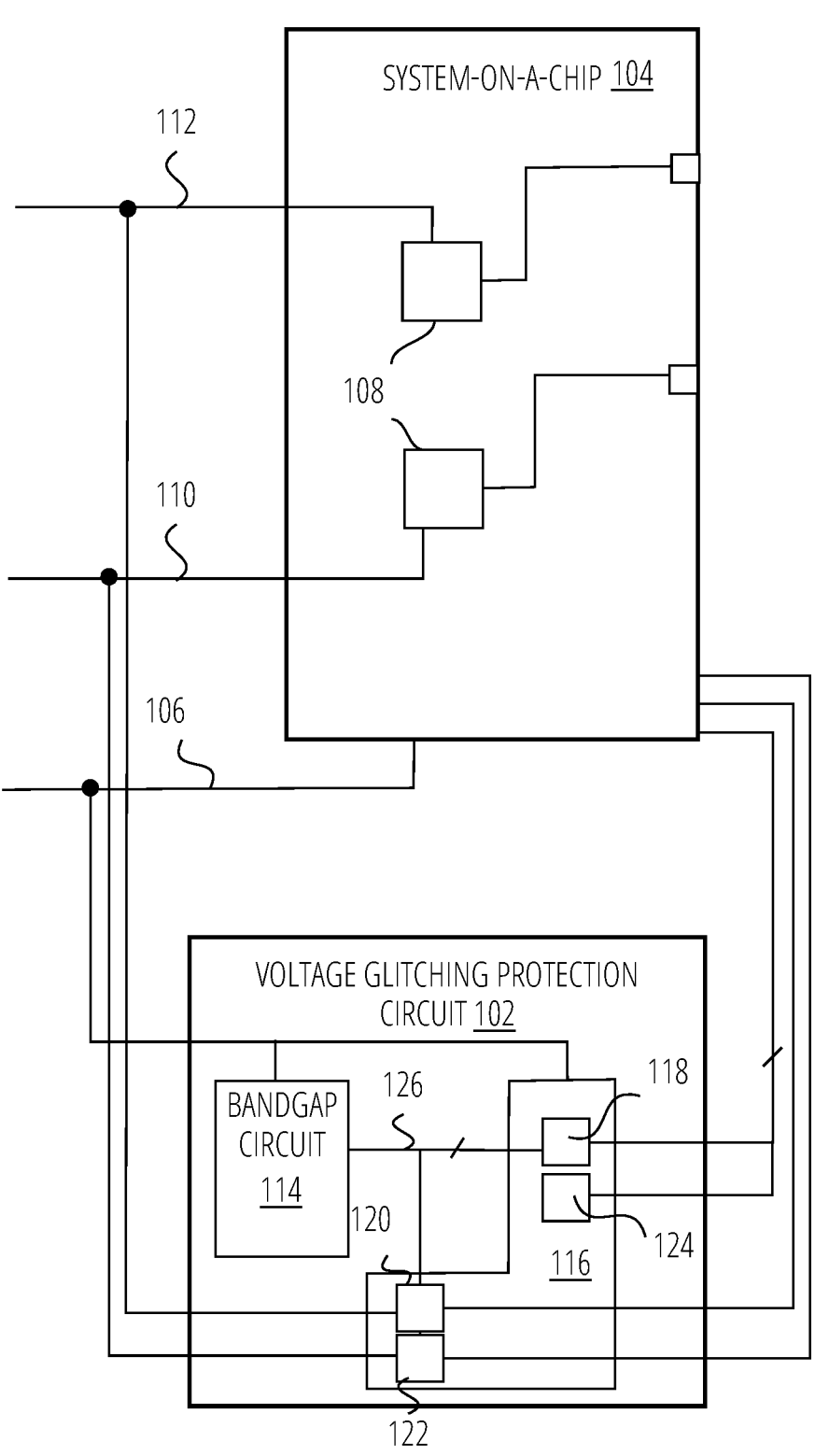
FIG. 1 depicts a device comprising a voltage glitching protection circuit 102 in one embodiment.

Circuit embodiments are disclosed that improve the accuracy and robustness of aberrant voltage events detection on multiple power rails. The circuits utilize a plurality of monitor circuits for multiple power rails, each utilizing reference voltages generated by a bandgap voltage generator. The voltage monitor for the dependent power rail is supplemented by a self-referencing power-on detector. In one embodiment the bandgap circuit and the power-on detector are supplied by a common power rail (the dependent power rail). The bandgap generates multiple reference voltages for multiple different voltage monitors and by its nature provides improved immunity to the effects of voltage-temperate variation on these voltage monitors.

Various terminology utilized herein may be better understood in light of the following:

"Bandgap circuit" refers to any number of well-known circuits designed to generate one or more reference voltage that is held constant to a high degree regardless of power supply variations, temperature changes, or circuit loading.

"Coarse level reset signal" refers to a reset signal that is generated responsive to slower changes in some monitored voltage, subject to larger process, voltage, and temperature variations in a configured voltage threshold level that triggers the reset signal.

"Fine level reset signal" refers to a reset signal that is generated responsive to faster changes (relative to changes that trigger a coarse level reset signal) in some monitored voltage, with finer control over effects of process, voltage, and temperature variations to the configured voltage threshold level that triggers the reset signal.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Reference voltage" refers to a voltage level that is utilized by a voltage monitor to detect aberrant voltage events on a power rail.

"Reset signal" refers to a signal applied to reset operation of a circuit or part of a circuit.

"System-on-a-chip" refers to an integrated circuit that integrates onto a single substrate a number of components typically utilized in a fully-functional modern computer or other electronic system. These components may typically include a central processing unit, memory interfaces, on-chip input/output devices, and secondary storage interfaces. Other components commonly found in systems-on-a-chip are modems and graphics processing units.

FIG. 1 depicts a device comprising a glitch voltage glitching protection circuit 102 in one embodiment. The device comprises a system-on-a-chip 104 comprising components configured to receive power from a power rail 106. The system-on-a-chip 104 comprises a plurality of input-output devices 108 configured to receive power from at least one power rail different than the power rail 106. In this example the input-output devices 108 are configured to receive power from a power rail 110 and power rail 112. In some cases the power rail 106 may also supply input-output devices of the system-on-a-chip 104.

The voltage glitching protection circuit 102 comprises a bandgap circuit 114 and detector logic 116. The detector logic 116 comprises voltage glitch detectors 118, 120, 122 and a power-on detector 124 configured to detect voltage glitching attacks on the power rails 106, 110, and 112. The voltage glitch detector 118 utilizes a first plurality of reference voltages 126 generated by the bandgap circuit 114 to generate a first reset signal in response to a voltage glitching attack on the dependent power rail 106. This reset signal is supplemented by a signal output by the power-on detector 124, which is configured to operate independently of the reference voltages 126 from the bandgap circuit 114 to generate a second reset signal in response to a voltage glitching attack on power rail 106.

The voltage glitch detector 120 utilizes a second plurality of the reference voltages 126 to detect voltage glitching attacks on the power rail 112, and the voltage glitch detector 122 utilizes a third plurality of the 126 to detect voltage glitching attacks on the power rail 110.

Figure 2:
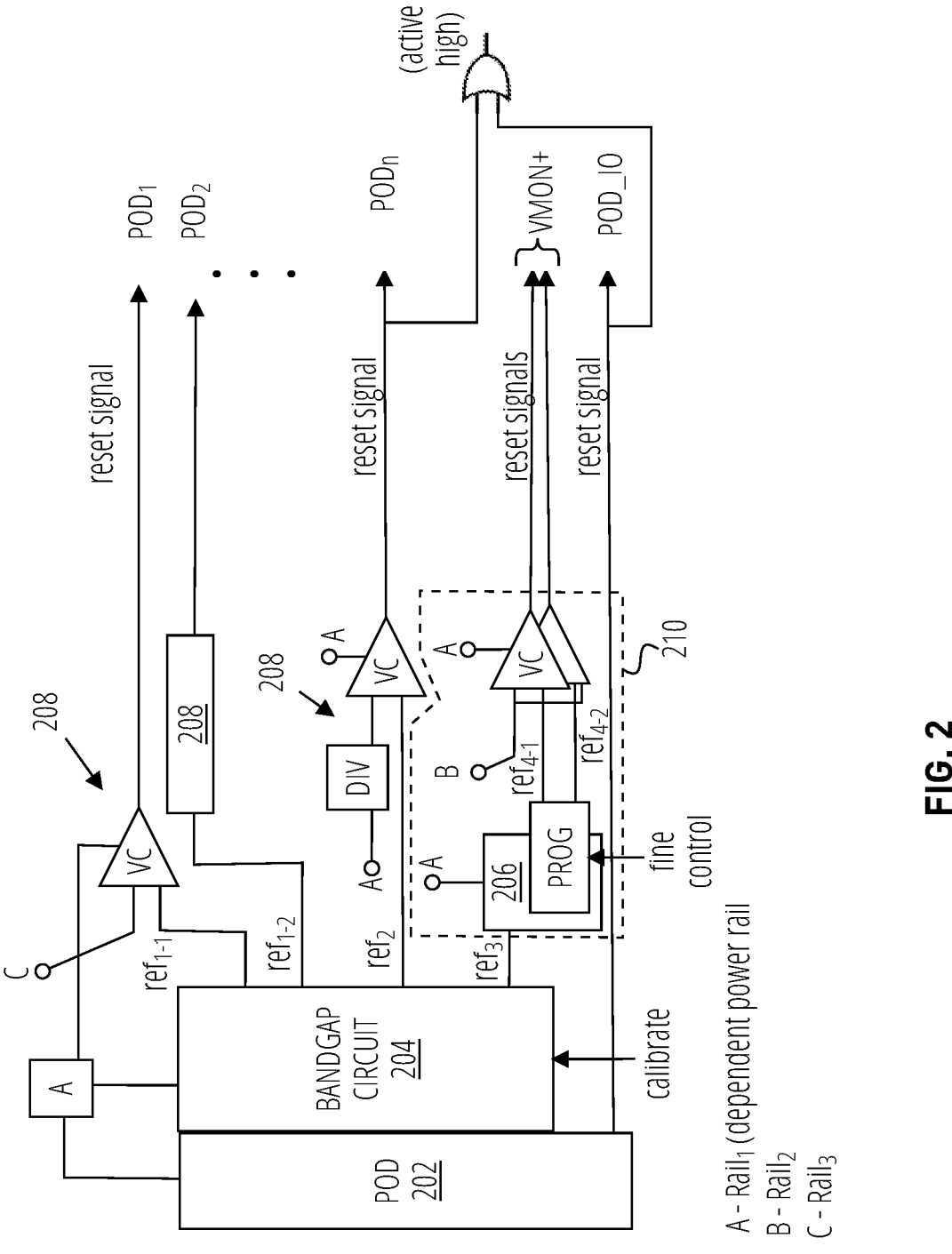
FIG. 2 depicts a circuit to protect against voltage glitching attacks on multiple power rails, in accordance with one embodiment.

FIG. 2 depicts a multi-rail voltage glitching protection circuit in one embodiment. The circuit comprises, inter alia, a power-on detector 202, a bandgap circuit 204, and a programmable digital-to-analog converter 206. The depicted example protects against independent or simultaneous voltage glitching attacks on three power rails, but the features are readily adapted to protection of a different number of power rails (e.g., two or more).

The bandgap circuit 204 is advantageously utilized to reduce VT variation of the protection circuit as well as enabling the efficient protection of multiple power rails against independent or simultaneous voltage glitching attacks.

A first protection circuit comprises the logic to generate the signals $POD_n$ and POD_IO that when combined detect a wide range of voltage glitching attacks on a the dependent power rail ($RAIL_1$), e.g., a power rail supplying the power-on detector 202, digital-to-analog converter 206, and bandgap circuit 204 components of the protection circuit itself. POD_IO is generated by the power-on detector 202 for $RAIL_1$, which does not operate from a reference voltage generated by the bandgap circuit 204. The power-on detector 202 is thus self-referencing and independent of the bandgap circuit 204, enhancing protection against voltage glitching attacks that target the bandgap circuit 204 reference voltages or the power supply voltages of the voltage comparators (VCs) and digital-to-analog converter 206.

Each reference voltage generated by the bandgap circuit 204 may be held at a stable value (e.g., using a capacitor) so that glitching $RAIL_1$ that powers both the bandgap circuit 204 and the comparators will result in the reference voltages holding steady and the comparators tripping to indicate the voltage glitching attack is taking place. This holds true only when the glitching on $RAIL_1$ does not collapse the function of the bandgap circuit 114. When the magnitude of the $RAIL_1$ glitching is large enough to collapse the bandgap circuit 114, the reference voltages become unstable. In this situation the self-referenced power-on detector 202 may be relied upon to provide a reset signal in response to the glitch.

Faster voltage glitching attacks on the power rail are detected by $POD_n$. Slower voltage glitching attacks on the power rail are detected by the combination of $POD_n$ and POD_IO.

The POD_IO signal provides a coarse level of voltage glitching protection. The $POD_n$ signal provides a finer (more precise) level of voltage glitching protection. Combined, POD_IO and $POD_n$ protect across a wider range of voltage glitching attacks on $RAIL_1$ than either provides alone. $RAIL_1$ supplies the comparators that generate the reset signals and also supplies the bandgap circuit, which is the source of reference voltages to the comparators. For this reason, glitching $RAIL_1$ at the same time as glitching another rail may avoid detection of a glitch on one or both power rails. This weakness, found in conventional solutions, is mitigated by the combination of POD_IO and $POD_n$.

Another protection circuit generates signal $POD_1$ to detect voltage glitching attacks on a third power rail ($RAIL_3$).

In general the voltage glitching protection circuit may comprise multiple detectors 208 to generate POD reset signals for different power rails. Each detector may be configured with one or both of a different reference voltage and a different power rail input.

Another detector 210 of the protection circuit generates signal VMON+ to detect voltage glitching attacks on a power rail ($RAIL_2$). The VMON+ signal comprises two or more reset signals generated by respective comparators. Each of the comparator receives a (typically different) voltage threshold level ($ref_{4-1}$ and $ref_{4-2}$) from the digital-to-analog converter 206. These reference voltages may be set programmatically in the digital-to-analog converter 206. The bandgap circuit 204 provides a reference voltage $ref_3$ to the digital-to-analog converter 206, and the digital-to-analog converter 206 provides fractions of this reference voltage as $ref_{4-1}$ and $ref_{4-2}$ at its outputs, based on the programmed settings. VMON+ thus provides 'over-under detection', i.e. a window comparison, of the voltage being applied on $RAIL_2$. This mechanism for protecting the power rail does not suffer from the clock dependencies and slower glitch responsiveness of conventional mechanisms.

Figure 3:
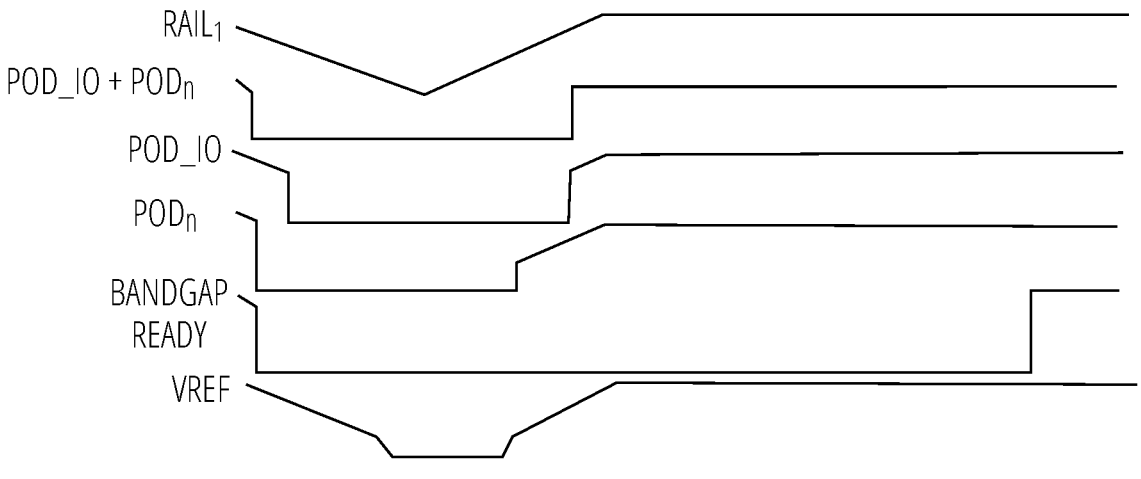
FIG. 3 depicts an exemplary signal timing diagram for a blackout glitch on a power rail.

An exemplary signal timing diagram for the voltage glitching attack protection circuit in response to a slower blackout glitch on $RAIL_1$ is depicted in FIG. 3.

Figure 4:
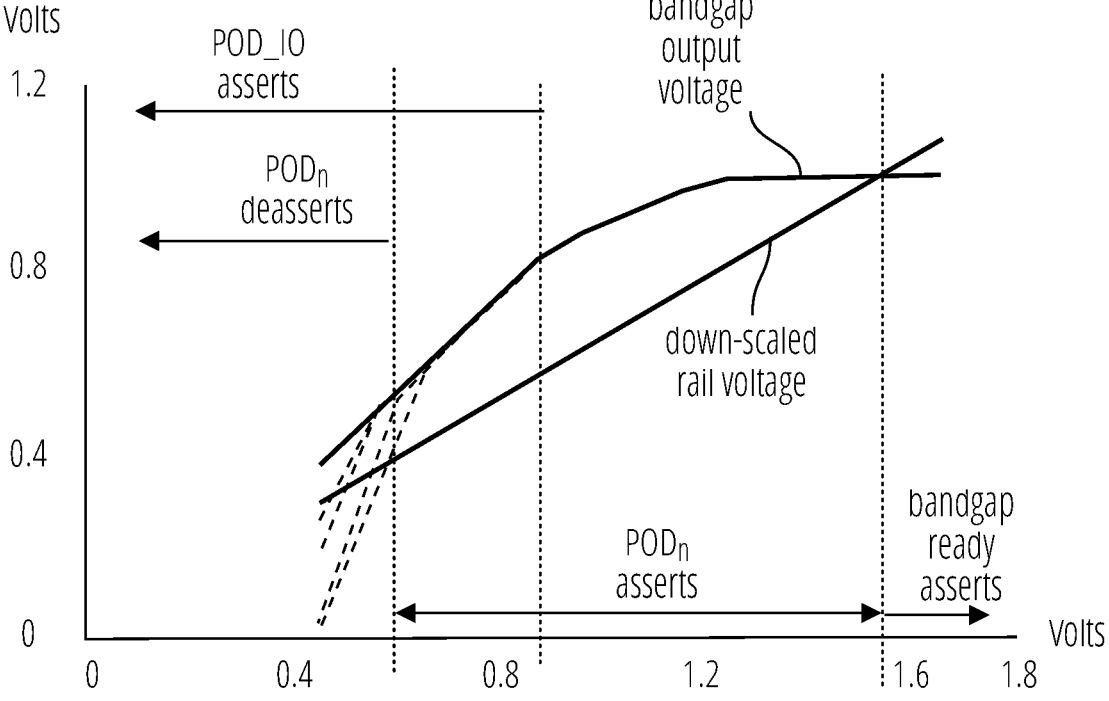
FIG. 4 depicts example voltage profiles for the circuit embodiment of FIG. 2.

Referring to FIG. 4, the circuits generating POD_IO and $POD_n$ form a combination voltage glitching detection and prevention mechanism. POD_IO provides a coarse level of detection and generates a first reset signal. $POD_n$ generates a finer level of detection and generates a second reset signal. There's an overlap between the detection regions of the two detectors.

In FIG. 4, where a configured down-scaled power rail voltage level falls below the reference voltage output by the bandgap circuit 204, the $POD_n$ reset signal asserts. This reset signal should maintain until the dependent power rail voltage recovers above the higher configured voltage threshold level for the $POD_n$ detector. However, at voltages that fall below a certain level (e.g., <0.6 v in FIG. 4), the bandgap collapses and the (down-scaled) power rail voltages exceeds the voltage output of the bandgap circuit 204. A false de-assertion of the POD$_n$ reset signal transpires. However, the POD_IO reset signal continues to correctly assert.

The bandgap circuit 204 may take a relatively long time (relative to the settling time of the comparators, for example) to reach steady-state operational status, once it resets or powers up. Therefor the system may include a signal "bandgap ready" to indicate that the reference voltages supplied to the comparators, and hence the comparator reset outputs, are trustworthy. The "bandgap ready" signal may be generated in manners known in the art, such as for example using a countdown timer configured to assert after a known output settling time for the bandgap circuit 204.

Dotted plot lines indicate exemplary behavior of the bandgap circuit 204 output voltage at different voltage-temperature process corners.

The circuits to generate POD_IO and POD$_n$ may be utilized in combination, with POD_IO providing a coarse level reset signal that operates independently of the bandgap circuit 204. POD$_n$ provides a fine level reset signal utilizing reference voltages from the bandgap circuit 204. The maximum glitch skew rate detectable by POD_IO and POD$_n$ is configurable using components of appropriate sensitivity in the corresponding detector 208 and power-on detector 202.

Figure 5:
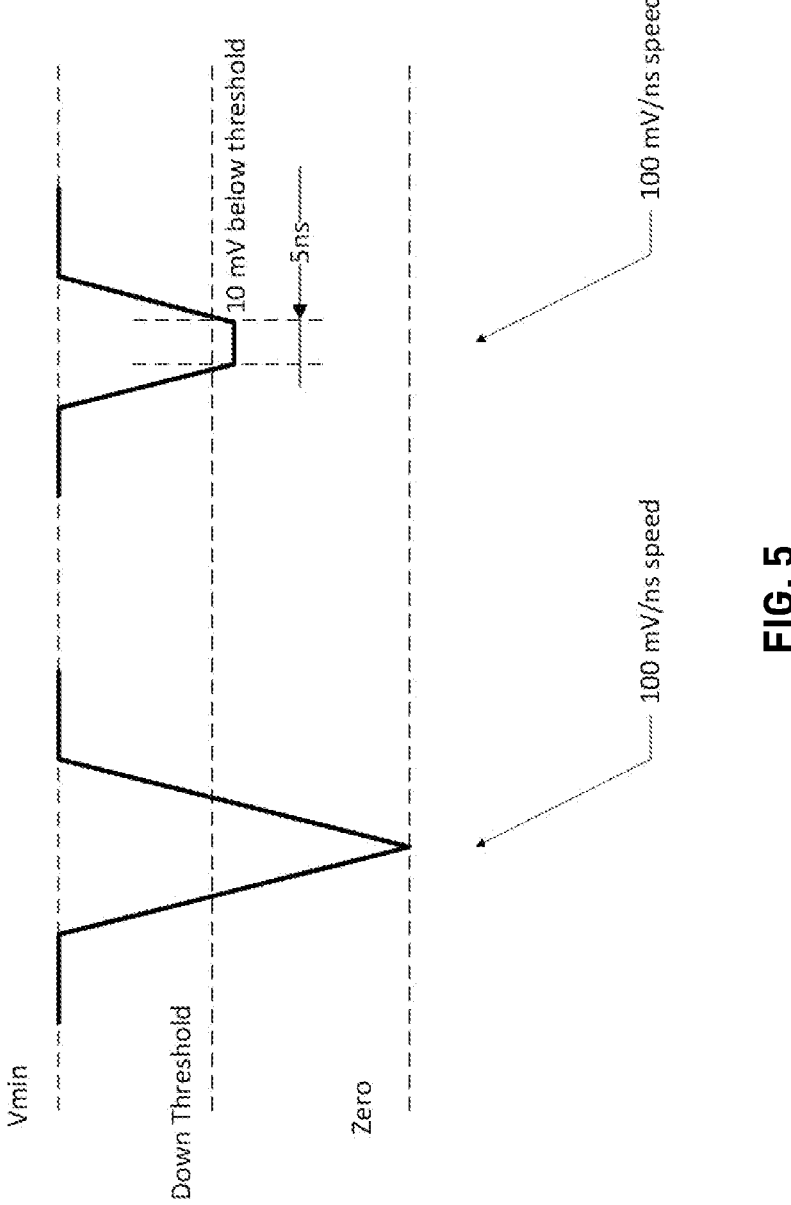
FIG. 5 depicts an example of the type of voltage glitching that may be detected with a system in accordance with the embodiment of FIG. 2

FIG. 5 depicts an example of the type of voltage glitching that may be detected with a system in accordance with the design of FIG. 2, with appropriate selection of component characteristics and reference voltage settings.

Two types of voltage glitching attacks are depicted in FIG. 5. One is a blackout voltage glitching attack, in which the power rail voltage is pulled down to 0 and then returns to its proper level. The other is a brownout voltage glitching attack, in which the power rail voltage is pulled down below a particular level, but not to zero, for a certain duration, and then returns to its proper level. The detectors for different power rails will only respond with a reset signal on condition that the voltage glitch is below the configured threshold level for a minimum time interval. The minimum time interval depends on how far under the reference threshold the power rail voltage drops.

FIG. 6 illustrates an example routine for responding to voltage glitching attacks on a system. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

A plurality of reference voltages are generated with a bandgap circuit at block 602. A first plurality of the reference voltages are applied to a first voltage glitching detector at block 604, and a self-referencing circuit to a second voltage glitching detector at block 606. The first voltage glitching detector generates a fine level reset signal for components of the digital device at block 608, and the second voltage glitching detector generates a coarse level reset signal for the components of the digital device at block 610.

LISTING OF DRAWING ELEMENTS 102 voltage glitching protection circuit
104 system-on-a-chip
106 power rail
108 input-output devices 110 power rail
112 power rail
114 bandgap circuit
116 detector logic
118 voltage glitch detector
120 voltage glitch detector
122 voltage glitch detector
124 power-on detector
126 reference voltages
202 power-on detector
204 bandgap circuit
206 digital-to-analog converter
208 detector
210 detector
602 block
604 block
606 block
608 block
610 block Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A circuit comprising:
   a bandgap circuit configured to generate a plurality of reference voltages;
   a first voltage glitching detection circuit;
   the first voltage glitching detection circuit configured to utilize a first one of the reference voltages and a first power rail voltage to generate a first reset signal in response to a voltage glitching attack on the first power rail;
   a second voltage glitching detection circuit configured to operate independently of the reference voltages to generate a second reset signal in response to the voltage glitching attack on the first power rail;
   a third voltage glitching detection circuit comprising:
      a digital-to-analog converter configured to generate a plurality of digital-to-analog converter-generated reference voltages; and
      a plurality of comparators configured to each receive at a first input a second power rail voltage, the comparators further configured to each receive at a second input one of the digital-to-analog converter-generated reference voltages.

2. The circuit of claim 1, wherein the second voltage glitching detection circuit comprises a self-referencing power-on detector for the first power rail.

3. The circuit of claim 1, wherein the power-on detector and bandgap circuit are configured to receive power from the first power rail.

4. The circuit of claim 1, wherein the first reset signal generated by the first voltage glitching detection circuit is a fine level reset signal.

5. The circuit of claim 1, wherein the second reset signal generated by the second voltage glitching detection circuit is a coarse level reset signal.

6. The circuit of claim 1, the first voltage glitching detection circuit comprising:
   a comparator configured to receive at a first input the first one of the reference voltages from the bandgap circuit; and
   the comparators configured to receive at a second input a scaled voltage from the first power rail.

7. The circuit of claim 6, wherein the power-on detector, bandgap circuit, and comparator are configured to receive power from the first power rail.

8. The circuit of claim 1, the third voltage glitching detection circuit utilizing a second one of the reference voltages and the second power rail voltage to generate a third reset signal in response to a voltage glitching attack on the second power rail.

9. The circuit of claim 1, wherein the digital-to-analog converter is programmable to generate the digital-to-analog converter-generated reference voltages in a window of a reference voltage received from the bandgap circuit.

10. The circuit of claim 1, wherein the power-on detector, bandgap circuit, and the third voltage glitching detection circuit are configured to receive power from the first power rail.

11. A device comprising:

a system-on-a-chip configured to receive power from a first power rail;

a plurality of input-output devices configured to receive power from a second power rail;

a bandgap circuit configured to generate a plurality of reference voltages;

a first voltage glitching detection circuit configured to utilize a plurality of the reference voltages to generate a first reset signal in response to a voltage glitching attack on the first power rail;

a second voltage glitching detection circuit configured to utilize one of the plurality of reference voltages to generate a second reset signal in response to a voltage glitching attack on the second power rail;

a third voltage glitching detection circuit configured to operate independently of the reference voltages to generate a third reset signal in response to the voltage glitching attack on the second power rail; and fourth voltage glitching detection circuit configured to utilize one of the plurality of reference voltages to generate a fourth reset signal in in response to a voltage glitching attack on a third power rail, the fourth voltage glitching detection circuit comprising:

a digital-to-analog converter configured to generate a plurality of digital-to-analog converter-generated reference voltages; and a plurality of comparators configured to each receive at a first input a voltage from the third power rail, the comparators further configured to each receive at a second input one of the digital-to-analog converter-generated reference voltages.

12. The device of claim 11, wherein the third voltage glitching detection circuit comprises a self-referencing power-on detector for the second power rail.

13. The device of claim 11, wherein the second reset signal is a fine level reset signal.

14. The device of claim 11, wherein the third reset signal is a coarse level reset signal.

15. The device of claim 11, further comprising:

logic to form a combined reset signal from the second reset signal and the third reset signal.

16. The circuit of claim 11, the first voltage glitching detection circuit comprising:

logic configured to monitor a window of the first power rail voltage.

17. A method comprising:

operating a bandgap circuit to generate a plurality of reference voltages;

applying a first one of the reference voltages and a first power rail voltage to a first voltage glitching detection circuit to generate a first reset signal in response to a voltage glitching attack on the first power rail;

operating a second voltage glitching detection circuit independently of the reference voltages to generate a second reset signal in response to the voltage glitching attack on the first power rail;

operating a third voltage glitching detection circuit by:

generating a plurality of additional reference voltages with a digital-to-analog converter;

applying a different one of the additional reference voltages at a first input to each of a plurality of comparators; and applying a second power rail voltage to a second input to each of the comparators.

* * * * *